(12) United States Patent
Morciniec et al.

(10) Patent No.: US 7,149,725 B2
(45) Date of Patent: Dec. 12, 2006

(54) APPARATUS AND METHOD OF COMMUNICATING CHANGES IN STATES OF CONTRACTUAL RESPONSIBILITIES

(75) Inventors: Michal Morciniec, Bristol (GB); Mathias Jean Rene Salle, Palo Alto, CA (US); Abdel Boulmakoul, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 493 days.

(21) Appl. No.: 10/251,428

(22) Filed: Sep. 20, 2002

(65) Prior Publication Data

US 2004/0024683 A1    Feb. 5, 2004

(30) Foreign Application Priority Data

Sep. 21, 2001    (GB) .................................. 0122867.5

(51) Int. Cl.
*G06Q 99/00*    (2006.01)
*H04J 3/22*    (2006.01)

(52) U.S. Cl. .......................... 705/80; 370/466; 714/39; 709/230

(58) Field of Classification Search .................. 705/80, 705/500; 710/11, 105–106, 314–315; 726/1–15; 709/230–234; 370/395.5, 395.52, 466–469; 713/151; 714/39

See application file for complete search history.

(56) References Cited

U.S. PATENT DOCUMENTS 6,539,030 B1 *    3/2003    Bender et al. .............. 370/469
6,728,958 B1 *    4/2004    Klein et al. .................. 718/101
6,782,414 B1 *    8/2004    Xue et al. .................... 709/206
6,801,786 B1 *    10/2004    Korpela .................... 455/552.1
6,836,803 B1 *    12/2004    Swartz et al. ............... 709/227
2001/0039629 A1 *    11/2001    Feague ....................... 713/400
2002/0069257 A1 *    6/2002    Rigori et al. ............... 709/217
2002/0099578 A1 *    7/2002    Eicher et al. .................. 705/7

FOREIGN PATENT DOCUMENTS

EP    1119140 A1 *    7/2001

OTHER PUBLICATIONS

Birman, "The Process Group Approach to Reliable Distributed Computing", Communications of the ACM, v36n12, pp. 37-53+, Dec. 1993, ISSN: 0001-0782.*

* cited by examiner

*Primary Examiner*—Mary D. Cheung

(57) ABSTRACT

It is often difficult to reliably monitor contract performance and receive timely information as to whether a party is actually going to carry out their contractual obligations. Accordingly the invention provides an apparatus and methods for communicating the changes in states of the contractual commitments of contracting parties according to an agreed commitment model and using agreed messaging protocols. There is a storage facility for the commitment data which is accessible by an encoding engine, in addition to a commitment state store that forms a part of the commitment model and stores the known commitment state of parties. The encoding engine encodes commitment data according to the commitment model and data received by an external information source, before passing the message to a messaging module for formatting and sending out to the other contracting party.

17 Claims, 4 Drawing Sheets

| 301 Message Identifier |
|---|
| 302 Message Type |
| 303 Roles |
| 304 Commitment Identifier |
| 305 Contract Identifier |
| 306 Old Commitment State |
| 307 Proposed Transition |

Fig. 3

| 401 Commitment Identifier |
|---|
| 402 Actual Commitment State |
| 403 Proposed Transition |
| 404 Information Source Name |
| 405 Procedure Name |
| 406 Parameters |

Fig. 4

APPARATUS AND METHOD OF COMMUNICATING CHANGES IN STATES OF CONTRACTUAL RESPONSIBILITIES

BACKGROUND OF THE INVENTION

1. Field of the Invention

The present invention relates to an apparatus and method of communicating changes in the states and contractual responsibilities of parties, and in particular to an apparatus and method for communicating these changes using an agreed message exchange protocol.

2. Description of Related Art

Recent years have witnessed an explosion in the number of parties engaging in e-commerce. On-line catalogues, shop fronts, auctions and electronic market places aggregate potentially large numbers of buyers and sellers allowing them to engage in a whole host of virtual transactions. Increasingly traders (agent programs acting on behalf of enterprise roles) are used by parties in the e-market place to negotiation goods of services. When agreement is reached, the traders return with a contract that specifies the details of the trade, and which they have to execute to perform their contractual commitments related to this trade.

It is often difficult to reliably monitor contract performance and receive timely information as to whether a party is actually going to carry out their contractual obligations. In today's age, people communicate using the telephone or fax or via e-mail, and as events unfold that impact commitment levels for an agreed contract, ad-hoc telephone conversations, e-mails and faxes are used to assess new commitment levels. The main drawbacks of these communication methods are that they are often unstructured and untimely, no records communication can be readily kept, and there are high costs associated with the management of data related to this process.

R. G. Smith "The Contract Net Protocol: High Level Communication and Control in a Distributed Problem Solver", IEEE Transactions on Computers 1980, C-29, 12 pp. 1104–1113 focuses on the aspect of bidding for task execution. When a decision is made to accept a task no further state except "completed" is allowed. The problem with this is that once a part commits to undertake a task it cannot refuse to carry out a task.

T. W. Sandholm, V. R. Lesser, "Advantages of a Levelled Commitment Contracting Protocol", Proceedings of AAAI-96, pp. 126–133 Builds the Smith document and allows a party to refuse to execute a task after it has been agreed. This document discloses using a single parameter analysis (price) of utility of not performing a task taking into account the penalty. The document focuses on decision theory for committing or decommitting from a task. The disclosure does not consider the notion of a beneficiary of obligation that may waive this obligation, nor does it specify a way to handle delegated obligations. In addition, the document does not specify the contract model that contains obligations that need to be communicated, and neither does it specify the message format (content) to be exchanged by the contract parties.

Hewlett Packard "ChangeEngine Application Programming Interface Reference Guide", HP Part No 2279-90024 ChangeEngine Access Protocol carried over HTTP allows clients to connect and send requests to the Work List server. The protocol allows authorised clients to access a work list, set and read data, and start a process associated with the task. A notification message can be returned to the authorised client if required when a process changes date. The protocol does not allow a work item to be refused and so de-committing from a task is not a normal operation. When a client requests the start of a process and it cannot be started an exception is generated. The disclosed model focuses on processes and work items (activity centric) rather than contractual obligations (state centric).

J. R. Putman "Architecting with RM-ODP", Prentice Hall 2000 introduces a policy model for specifying a policy being part of an environment contract. The document specifies policy (commitment) types Obligation, Prohibition, Permission and Authorisation to control actions. The disclosure does not consider a notion of a state associated with the Policy that changes as future events occur, nor does it introduce a protocol to communicate changes of policy states as viewed by each enterprise.

None of the above-mentioned disclosures addresses the need for a system that allows parties to estimate the likelihood of a commitment being actually realised by a party and to utilise this information promptly for planning, scheduling, forecasting and other processes of value in the enterprise.

The present invention seeks to address or significantly mitigate one or more of the aforementioned problems.

BRIEF SUMMARY OF THE INVENTION

According to a first aspect of the invention there is provided an apparatus for communicating the contractual commitments of a party, comprising: an agreed commitment model; a commitment encoding engine for encoding commitment data for the party according to the agreed commitment model; a storage facility for storing the commitment data and which is accessible by the commitment encoding engine for retrieving the commitment data; a commitment state store that forms a part of the commitment model and stores data related to the known commitment state of parties to a contract, the commitment state store being accessible by the commitment encoding engine for retrieving the commitment state data; a decision descriptor store for storing decision descriptors for identifying an External Information Source, a procedure to be executed by the External Information Source and parameters required by the procedure; and a messaging module for formatting a message containing information related to a change of state of the commitment model in accordance with an agreed messaging protocol, and for sending, receiving and relaying such messages to the party.

According to a second aspect of the invention there is provided a method of communicating changes in states of contractual commitments of parties to a contract, comprising the steps: agreeing a messaging protocol to be used for exchanges of messages between parties; receiving knowledge of events relevant to commitment states of the contract parties; retrieving commitment state data from the commitment state store; deciding which message should be sent to the contract party based on the commitment state data and knowledge of events using a commitment encoding engine; formatting the message to be sent using the messaging module in accordance with the agreed messaging protocol; and sending the formatted message to the contract party over a communications link.

According to a third aspect of the invention there is provided a computer readable storage medium storing instructions that, when executed by a computer, cause the computer to perform a method of communicating changes in states of contractual commitments of parties to a contract according to the second aspect.

Other aspects and futures of the present invention will become apparent to those ordinarily skilled in the art upon review of the following description of the specific embodiments of the invention in conjunction with the accompanying figures.

BRIEF DESCRIPTION OF THE DRAWINGS

Embodiments of the invention will now be described by way of example only, with reference to the drawings in which:

FIG. 3 is a block diagram of the message content used in the notification of changes in commitment level in accordance with the preferred embodiment of the invention; and FIG. 4 is a block diagram of the decision descriptor used to invoke a procedure in the External Information Source and obtain a true or false result.

DETAILED DESCRIPTION OF THE INVENTION

The invention introduces a state centric model of contractual commitments. The model allows commitment types (Obligation, Prohibition, Permission) to be expressed over roles, and apply them to actions ("obliged to do x") as well as states ("obliged to maintain parameter within agreed limits"). Each commitment type has a state associated with it that changes as future events that impact the commitment level occur. Furthermore, given the commitment model the communication protocol described herein allows independently operating contact parties to exchange information in a structured way, concerning the state of commitments during contracts delivery. A preferred embodiment enables information relevant to commitment undertaken under an agreed contract to be communicated to relevant contract parties. The information communicated about a change of state in the commitment can be exploited to construct probabilistic risk/utility decision/prediction models.

Figure 1:
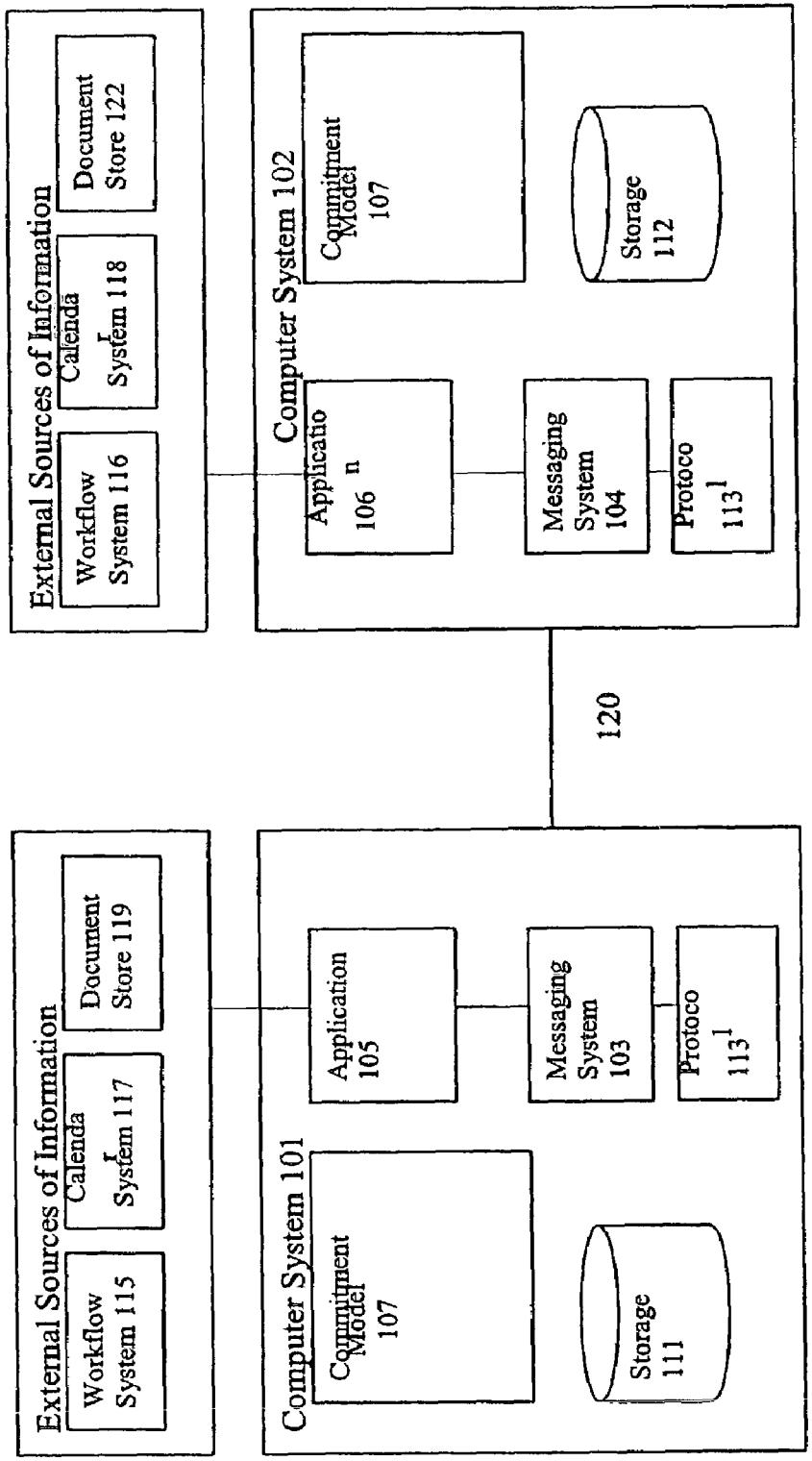
FIG. 1 is a schematic block diagram of a preferred embodiment according to the invention.

With reference to FIG. 1, the contract parties communicate via a network 120 that links the computer systems 101 and 102 that each runs independently. The communication takes place via sending of messages through messaging systems 103 and 104 according to an agreed shared protocol 113. The application 105 decides which message should be sent by the messaging system 103 based on the actual commitment state and knowledge of events relevant to the change of this state. The messaging system 103 formats an appropriate message and sends it via a communication link 120 to the relevant contracts party's computer system 102. The message is received by the messaging system 104 that checks it according to the protocol 113 and notifies the application 106. The application uses the shared common description of a commitment model 107 that includes a description of the states that a commitment may undergo. The application 106 based on the known commitment state and the proposed new commitment state contained in the received message makes a decision about the proposed state change. In addition the application 106, before making a decision, consults the decision descriptor shown in FIG. 4 for a given commitment, actual commitment state and proposed transition to a new state. If a descriptor exists the application 106 requests execution of the procedure named in field 405 from the External Information Source indicated in field 404 and supplies parameters listed in field 406 that may be required by the procedure. The result (true or false) of the procedure is then taken into account by the application 106 to arrive at a decision about the change of the state of the commitment. Once change is agreed the application 106 records the new state for the relevant commitment in storage 112 and notifies the message system 104 to send the acceptance message.

The state transitions are atomic. At any stage the application 106 can retrieve from the storage 112 a requested commitment and verify its state.

Figure 2:
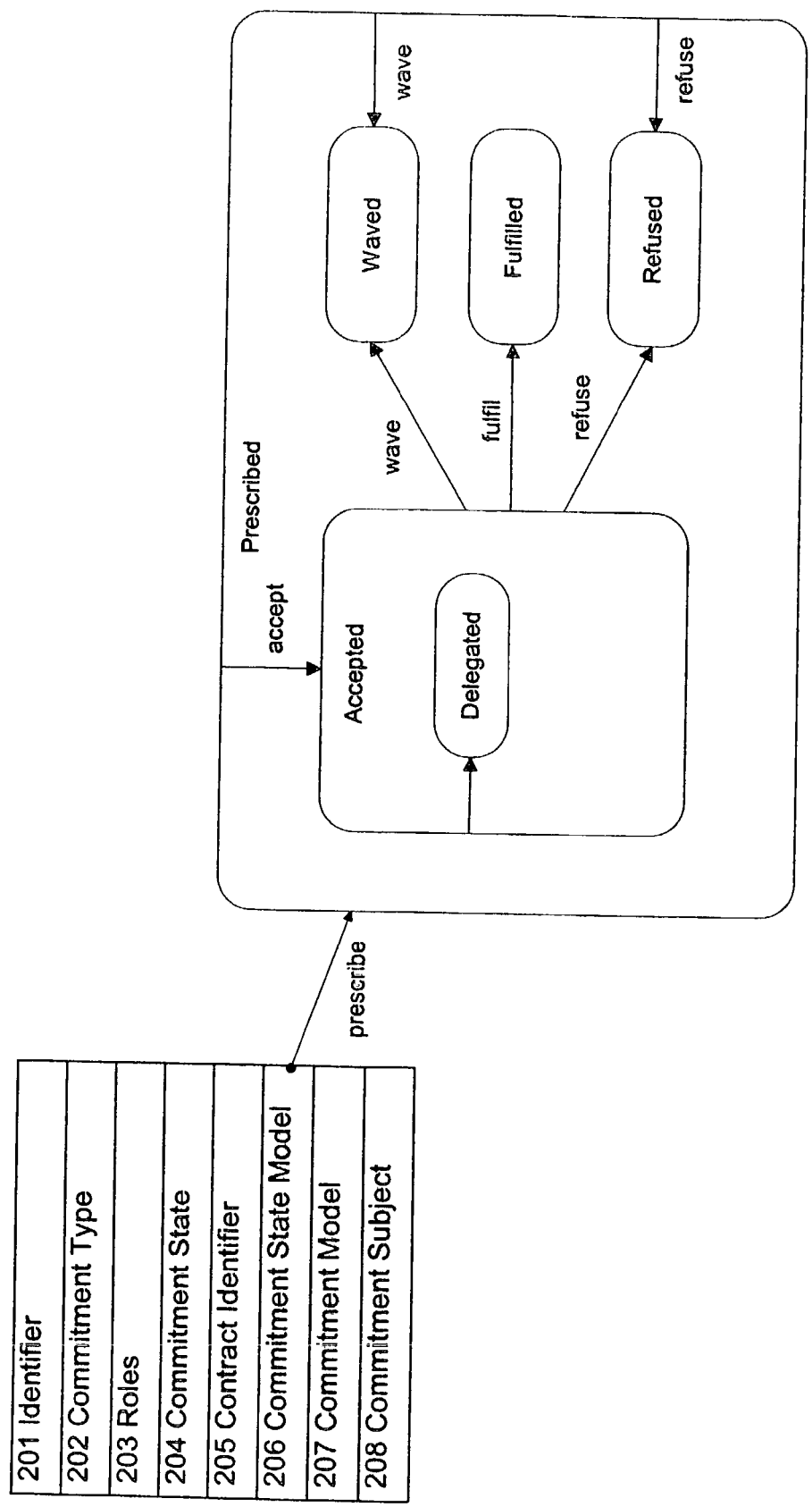
FIG. 2 is a block diagram showing an example commitment state model for the commitment type "Obligation" in accordance with the preferred embodiment of the invention.

The commitment model illustrated in FIG. 2 shows possible items that the model might comprise of. Commitments are made within a context of a contract that is identified by the contract identifier 205. Commitments are identified uniquely for each contract by the identifier 201. Commitments can be of different types 202. We consider here 4 types: obligation, permission, prohibition and authorisation. Each commitment has a number of roles 203 associated with it. There is one role that is the principal role of commitment, and one or more secondary roles that are the beneficiaries of the commitment. The principal role for the obligation is the role that is responsible for bringing about the commitment subject 208 which can be an action or state. The beneficiary role is the one who will benefit by the activation of the commitment subject 208. The commitment is in a given state that is one of the allowed by the commitment state model 206 that specifies permissible sequence of state changes. Potentially different commitment state models can be associated with different commitments.

An example of the content of the messages sent by the messaging system is shown in FIG. 3. The message can be identified by the identifier 301 and belongs to one of the following types 302: request, acknowledgement, no acknowledgement, exception. The role field identifies the sender role and addressee roles for this message. The contract identifier 305 allows to locate the commitment by its identifier 304 and by querying the storage 112 retrieve the commitment model shown in FIG. 2 from which further data if necessary can be retrieved. The message contains the proposed, new transition 307 from the old commitment state 306. The states and transitions for the commitment are given by their state model as shown in FIG. 2.

An example of the rules of the protocol 113 that the application logic 106 would need to take into account is given below:

| 401 | PROTOCOL RULE | | |
|---|---|---|---|
| | SEND | | RESPONSE |
| | REQ -> Ack/Nack/Exception | | |
| 402 | RULES FOR THE APPLICATION LOGIC | | |
| STATE TRANSITIONS | | TRANSITION Initiation and Termination | |
| AGREED | prescribe: | on send M-P:req(C1,O) response P-M:ack (C1,O) | |
| PRESCRIBED | accept: | on send B-P:req(C1,O) response P-B:ack (C1,O) | |
| | refuse: | on B-P:req(C1,O) response P-B:nack(C,O) | |
| | wave: | on B-P:req(C1,O-P) response P-B:ack (C1,O-P) | |
| ACCEPTED | delegate: | on send P-D:req(C2,O) response D-P:ack (C2,O) | |
| | refuse: | on B-P:req(C1,O) response P-B:nack(C1,O) | |
| | fulfil: | on P-B:req(C1,O) response P-B:ack(C1,O) | |
| | wave: | on P-B:req(C1,O) response B-P:ack(C1,O) | |

The protocol rule 401 specifies that sending of a message of request type may be followed by response of either acknowledgement, no acknowledgement or exception. The rules for the application logic 402 determine for a given old commitment state and a transition name when a transition will occur. For example if the of state is PRESCRIBED than transition REFUSE will take place if on a send of a request message from beneficiary B of commitment O directed to a principal role holding the commitment O under contract C1 the principal responds with a message of type no acknowledgement for commitment O under C1.

The preferred embodiment allows for the beneficiary to the obligation to typically send a message requesting confirmation that the contractual obligation is going to be carried out. Also, the benefit of storing those electronic messages that are exchanged between parties, is that they may be used as evidence later on if any disagreement should arise over the performance of a contract. Therefore a first party cannot for example cannot deny that a second party did not request an obligation or did not promise to fulfil an obligation because the second party will have a record.

The decision about the change of the state of commitments to a new one may involve results obtained from the External Information Sources. For example consider that the actual commitment state is ACCEPTED and a message is received from the counter-party that in the field 307 proposes the transition FULFILL. The application needs to decide whether to make a transition to FULFILLED state. The store of the decision descriptors is searched for a match on fields 401, 402 and 403 for the commitment in the actual state and the proposed transition. If a match is found the Application 106 uses fields 404, 405 and 406 to identify the External Information Source, and the procedure and its parameters to executed. For example, if the commitment type is an obligation to pay an invoice by a specific deadline, the External Information Sources to consulted are the Document Store and Calendar System to determine if this obligation is fulfilled. The procedure to be executed by the Document Store is "exists Payment Advice for Invoice" and the parameters are the payment sum and invoice number. The procedure returns value true is there exists a document Payment Advice for the given invoice and for an indicated sum. The procedure to be executed by the Calendar System is "current Date is earlier than" that takes a date as a parameter. When executed by the Calendar System the procedure returns true is the deadline has not yet passed. The Application 106 takes into account the returned values from the Information Sources to decide about the new commitment state.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier be any entity or device capable of carrying the program.

For example, the carrier may comprise a storage medium, such as ROM, or example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When the program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

Although the invention has been shown and described with respect to a best mode embodiment thereof, it should be understood by those skilled in the art that the foregoing and various other changes, omissions and additions in the form and detail thereof may be made therein without departing from the scope of the invention as claimed.

The invention claimed is:

1. An apparatus for communicating the contractual commitment of a party, comprising:
    an agreed commitment model;
    a commitment encoding engine for encoding commitment data for the party according to the agreed commitment model;
    a storage facility for storing the commitment data and which is accessible by the commitment encoding engine for retrieving the commitment data;
    a commitment state store that forms a part of the agreed commitment model and stores data related to a known commitment state of parties to a contract, the commitment state store being accessible by the commitment encoding engine for retrieving the known commitment state data;
    a decision descriptor store for storing decision descriptors for identifying an external information source, a procedure to be executed by the external information source and parameters required by the procedure; and
    a messaging module for formatting a message containing information related to a change of state of the agreed commitment model in accordance with an agreed messaging protocol, and for sending, receiving and relaying such messages to the party, wherein the commitment encoding engine comprises: a decision-making engine for deciding whether to change a present commitment state based on a received message, data relating to the present commitment state as stored in the storage facility and data relating to the states that the commitment may undergo as stored in the commitment state store.

2. An apparatus according to claim 1, wherein the storage facility is adapted to record changes in the state of commitments, on receipt of such data from the commitment encodingengine.

3. An apparatus according to claim 2, wherein the commitment encoding engine comprises:
    a decision-making engine for deciding whether to change a present commitment state based on a received message, data relating to the present commitment state as stored in the storage facility and data relating to the states that the commitment may undergo as stored in the commitment state store.

4. The apparatus of claim 1, wherein the party comprises a beneficiary of a contractual commitment.

5. The apparatus of claim 4, wherein the apparatus is configured to allow the beneficiary to send a message requesting confirmation that a contractual obligation is to be performed.

6. The apparatus of claim 1, wherein the party is responsible for activation of a contracual commitment.

7. A method of communicating changes in states of contractual commitment of parties to a contract, comprising the steps:
   agreeing upon a messaging protocol to be used for exchanges of messages between parties;
   receiving knowledge of events relevant to commitment states of contract parties;
   retrieving commitment state data from a commitment state store;
   deciding which message should be sent to a contract party based on the commitment state data and knowledge of events using a commitment encoding engine;
   formatting the message to be sent using a messaging module in accordance with the agreed messaging protocol; and
   sending the formatted message to the contract party over a communications link, wherein: the step of retrieving knowledge of events relevant to commitment states of the cotract parties comprises the steps:
   receiving a message at the messaging module relating to a change in the state of a commitment;
   checking the message according to the agreed messaging protocol;
   notifying the commitment encoding engine;
   accessing an agreed commitment model for data relating to the states that the commitment may undergo;
   accessing a storage facility for data on the present commitment state;
   retrieving decision descriptors for a given commitment;
   sending a request to an external information source to execute a named procedure with specified parameters;
   receiving the result of the named procedure;
   deciding whether to change the present commitment state based on the received message, the data relating to the present commitment state and the data relating to the states that the commitment may undergo as well as the result of the procedure returned from the external information source; and
   recording a new commitment state in the storage facility if it is decided to change the present commitment state.

8. A method according to claim 7, further comprising the step:
   notifying the messaging module to send a message confirming a change in the state of the commitment;
   formatting the message to be sent using the messaging module in accordance with the agreed messaging protocol; and
   sending the message confirming the change in the state of the commitment.

9. The method of claim 7, wherein the contract party comprises a beneficiary of a contractual commitment.

10. The method of claim 9, wherein the beneficiary is allowed to send a message requesting confirmation that a contractual obligation is to be performed.

11. The method of claim 7, wherein the contract party is responsible for activation of a contractual commitment.

12. A computer readable storage medium storing instructions that, when executed by a computer, cause the computer to perform a method of communicating changes in states of contractual commitments of parties to a contract comprosing the steps of:
   agreeing upon a messaging protocol to be used for exchanges of messages between parties;
   receiving knowledge of events relevant to commitment states of contract parties;
   retrieving commitment state data from a commitment state store;
   deciding which message should be sent to a contract party based on the commitment state data and knowledge of events using a commitment encoding engine;
   formatting the message to be sent using a messaging module in accordance with the agreed messaging protocol; and
   sending the formatted message to the contract party over a communications link, wherein: the step of retrieving knowledge of events relevant to commitment states of the contract parties comprises the steps:
   receiving a message at the messaging module relating to a change in the state of a commitment;
   checking the message according to the agreed messaging protocol;
   notifying the commitment encoding engine;
   accessing an agreed commitment model for data relating to the states that the commitment may undergo;
   accessing a storage facility for data on the present commitment state;
   retrieving decision descriptors for a given commitment;
   sending a request to an external information source to execute a named procedure with specified parameters;
   receiving the results of the named procedure;
   deciding whether to change the present commitment state based on the received message, the data relating to the present commitment state and the data relating to the states that the commitment may undergo as well as the results of the procedure returned from the external information source; and
   recording a new commitment state in the storage facility if it is decided to change the present commitment state.

13. A system of communicating changes in states of contractual commitments of parties to a contract, comprising:
   means for agreeing upon a messaging protocol to be used for exchanges of messages between parties;
   means for receiving knowledge of events relevant to commitment states of contract parties;
   means for retrieving commitment state data from a commitment state store;
   means for deciding which message should be sent to a contract party based on the commitment state data and knowledge of events using a commitment encoding engine;
   means for formatting the message to be sent using a messaging module in accordance with the agreed messaging protocol; and
   means for sending the formatted message to the contract party over a communications link, wherein: the means for retrieving commitment state data is configured to:
   receive a message at the messaging module relating to a change in the state of a commitment;
   check the message according to the agreed messaging protocol;
   notify the commitment encoding engine;
   access an agreed commitment model for data relating to the states that the commitment may undergo;
   access a storage facility for data on the present commitment state;
   retrieve decision descriptors for a given commitment;
   send a request to an external information source to execute a named procedure with specified parameters;
   receive the result of the named procedure;
   decide whether to change the present commitment state based on the received message, the data relating to the present commitment state and the data relating to the states that the commitment may undergo as well as the result of the procedure returned from the external information source; and record a new commitment state in the storage facility if it is decided to change the present commitment state.

14. The system of claim 13, further comprising:

means for notifying the messaging module to send a message confirming a change in the state of the commitment;

means for formatting the message to be sent using the messaging module in accordance with the agreed messaging protocol; and means for sending the message confirming the change in the state of the commitment.

15. The system of claim 13, wherein the party comprises a beneficiary of a contractual commitment.

16. The system of claim 15, wherein the apparatus is configured to allow the beneficiary to send a message requesting confirmation that a contractual obligation is to be performed.

17. The system of claim 13, wherein the party is responsible for activation of a contractual commitment.

* * * * *